Feb. 10, 1959 M. ZISERMAN 2,873,442

ANALOGUE TO BINARY CODED SYSTEM CONVERTER

Filed June 6, 1956 2 Sheets-Sheet 1

INVENTOR.
MARTIN ZISERMAN

BY Henry L. Shenier

ATTORNEY

ANALOGUE TO BINARY CODED SYSTEM CONVERTER

Filed June 6, 1956 2 Sheets-Sheet 2

INVENTOR.
MARTIN ZISERMAN
BY Harry L. Shaier
ATTORNEY

United States Patent Office 2,873,442

Patented Feb. 10, 1959

2,873,442

ANALOGUE TO BINARY CODED SYSTEM CONVERTER

Martin Ziserman, Hartsdale, N. Y., assignor, by mesne assignments, to United Aircraft Corporation, East Hartford, Conn., a corporation of Delaware Application June 6, 1956, Serial No. 589,624

20 Claims. (Cl. 340—347)

My invention relates to an analogue to binary coded system converter and more particularly to a converter which produces a binary coded output in any even-numbered system.

The decimal system is the most commonly used form of number system. The binary system is the most advantageous system for use in computers. It is especially desirable, therefore, to produce a digital representation by a binary coded decimal system. It is also desirable at times to produce a digital output in some particular binary coded even-numbered system other than the decimal system, as for example in a binary coded duodecimal system. The copending application of Jack B. Speller, Serial No. 464,774, filed October 26, 1954, discloses a converter for producing a representation in the natural binary code of mechanical displacement. This device will as well produce binary coded outputs of systems which are integral powers of the number 2, such as the quaternary, the octal and the sexadecimal systems. But the device disclosed in the said copending application will not produce unambiguous binary coded representa tions in, for example, the senary, decimal or duodecimal systems, since these are even-numbered systems which are not integral powers of the number 2. The copending application of Carl F. Schaefer et al., Serial No. 562,438, filed January 31, 1956, discloses a cyclical converter for producing a binary digital representation of mechanical rotation where the cyclic maximum count is any even number, but this cyclical converter contemplates producing only a digital output in the natural binary code. I have determined that, in producing binary coded outputs in any particular even-numbered system, a plurality of groups of outputs is required. The output of each group represents a digit in the system and the nmber of groups corresponds to the number of desired digits in the system. Each group of outputs is in the natural binary code and the number of outputs in each group will be sufficient to represents a digit in the system and the number of groups least equal to the system number.

I have invented an analogue to binary coded system converter which produces an unambiguous output representation in any binary coded even-numbered system such as, for example, a binary coded decimal system which may be employed directly in connection with those digital computers which operate on a coded decimal system.

One object of my invention is to provide an analogue to digital converter which produces an unambiguous binary coded output in any even-numbered system.

Another object of my invention is to provide an analogue to binary coded system converter which is small and light, requires little driving torque and consumes little power.

A further object of my invention is to provide an analogue to binary coded system converter which need employ only one external auxiliary logic or switching circuit, where the other switching operations are inherently performed internally.

A still further object of my invention is to provide an analogue to binary coded system converter which, in its simplest form, has only one moving part and requires no auxiliary gearing.

Other and further objects of my invention will appear from the following description.

In general my invention contemplates the provision of a converter having a plurality of rows of conductive elements mounted on an insulating member which is adapted for movement. The first row is composed of elements of predetermined length so spaced as to define therebetween nonconducting spaces of predetermined length and represents the least significant binary coded digit of the least significant digit of the chosen number system. The sum of these elements and spaces is the maximum count. This first row is included in a first group of rows to represent in the natural binary code the first digit of the chosen even-numbered system. A second group of rows generally equal in number to the first group will provide the second least significant digit of the given number system. It will be appreciated then that the pattern in the first group of rows will be repeated a number of times generally equal to the system number. Consequently, the pattern in the first group will generally be internally cyclic; that is, the system number diminished by unity is followed immediately by zero; and zero and the system number diminished by unity are adjacent representations. For certain of the rows except the first, the nonconductive spaces are replaced by auxiliary or complementary conductive elements from which complementary outputs are obtained. I may also provide a rotary form of my device having circles of conductive segments, which is externally cyclic; that is, the maximum count is immediately followed by zero, and the maximum count and zero are adjacent representations. I provide two inputs complementary to one another; that is, one input represents "1" when the other represents "0," and vice versa, to each row or circle. A predetermined spacing between the two complementary inputs to a particular row or circle of half the length of the shortest element of that row or circle provides a tolerance of ±¼ the length of that element which avoids ambiguity at transfer points; that is, the points in a row where the output changes from a "0" to a "1," or vice versa.

In the accompanying drawings which form part of the instant specification and which are to be read in conjunction therewith and in which like reference numerals are used to indicate like parts in the various views.

Figure 1:
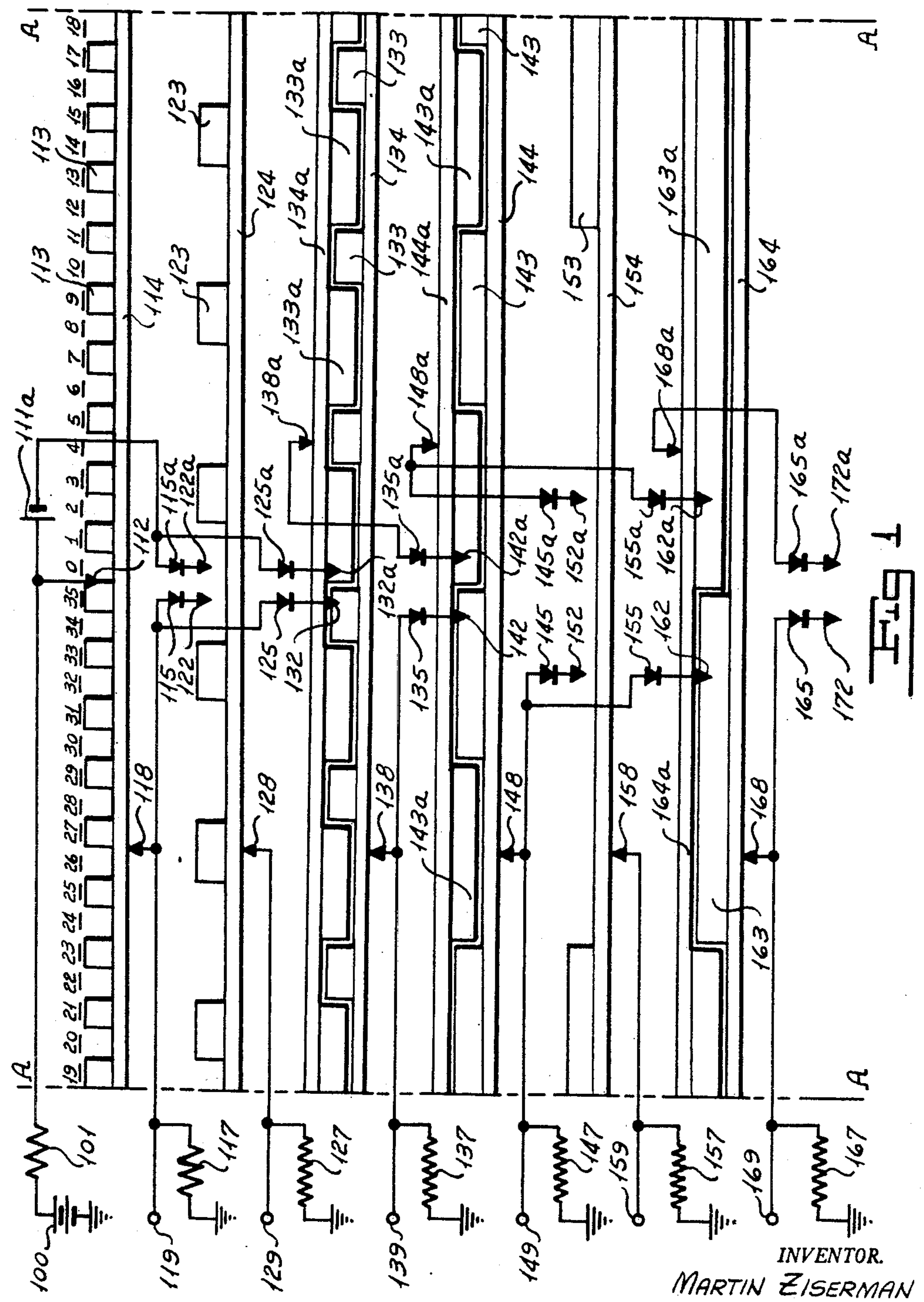
Figure 1 is a schematic developed view of an externally cyclic form of my converter in which the digital output is provided in the binary coded senary system where circles of segments are mounted on an insulating disk which has been cut along the lines A—A and developed.

Referring more particularly to Figure 1, a first row or circle is composed of a number of elements or segments 113. To provide a maximum count of 36 as a linear function of relative displacement I have provided eighteen elements 113 of equal length and interelement spacing. Each of segments 113 is connected to a slip ring 114 to form a rack or ring of teeth. An input excitation battery 100 has its negative terminal grounded and its positive terminal connected through an input resistor 101 to brush 112, positioned sequentially to contact the segments 113 of the first circle. An output brush 118 contacting slip ring 114 is connected to output terminal 119 and to ground through an input loading resistor 117. Brush 112 is connected to the positive terminal of an auxiliary battery **111*a*. Segments 123 of a second circle are connected to a slip ring 124 to form a ring of teeth. Spaced input brushes 122 and 122*a* disposed to contact segments 123 are connected respectively to brush 118 and to the negative terminal of auxiliary battery 111a through blocking crystals 115 and 115a. An output brush 128 contacting slip ring 124 is connected to second circle output terminal 129 and to ground through a loading resistor 127. Segments 133 of a third circle are connected to a slip ring 134 to form a ring of teeth. The intersegment spaces are replaced by auxiliary segments 133a connected to an auxiliary slip ring 134a to form another intermeshing ring of teeth. Spaced input brushes 132 and 132a disposed to contact alternately segments 133 and 133a are connected respectively to brush 118 and to the negative terminal of auxiliary battery 111a through blocking crystals 125 and 125a. An output brush 138 contacting slip ring 134 is connected to output terminal 139 and to ground through a loading resistor 137. Segments 143 of a fourth circle are connected to a slip ring 144 to form a ring of teeth. The intersegment spaces are replaced by auxiliary segments 143a connected to an auxiliary slip ring 144a to form another intermeshing ring of teeth. Spaced input brushes 142 and 142a disposed to contact alternately segments 143 and 143a are connected respectively to brush 138 through a blocking crystal 135 and to an auxiliary brush 138a, disposed to contact slip ring 134a through blocking crystal 135a. An output brush 148 disposed to contact slip ring 144 is connected to an output terminal 149 and to ground through loading resistor 147. The fifth circle is composed of only one segment 153 connected to a slip ring 154. Spaced input brushes 152 and 152a disposed to contact segment 153 are connected respectively to brush 148 through blocking crystal 145 and through blocking crystal 145a to an auxiliary output brush 148a contacting slip ring 144a. An output brush 158 is connected to a fifth circle output terminal 159 and to ground through loading resistor 157**.

The sixth and last circle of segments may advantageously be composed of two intermeshing rings of teeth, as indicated, when it is desired that the maximum count be increased by the provision of another disk with suitable reduction gearing. A sixth circle segment 163 is connected to slip ring 164. Auxiliary segment 163a is connected to auxiliary slip ring 164a. Spaced input brushes 162 and 162a disposed to contact alternately segments 163 and 163a are connected respectively to output brush 148 through blocking crystal 155 and to brush 148a through blocking crystal 155a. An output brush 168 is connected to the sixth circle output terminal 169 and to ground through a loading resistor 167. Two spaced input brushes 172 and 172a, which would be disposed to contact the first or outermost circle of a second disk, would be connected respectively to brush 168 through blocking crystal 165 and through a blocking crystal 165a to a brush 168a contacting slip ring 164a and thereby would provide cascading between disks. The speed reduction may be 6 to 1, or perhaps 36 to 1, or any integral power of 6, the system number.

In operation, the output signal at terminal 119 represents 1's. The output signal at terminal 129 will represent 2's. The output signal at terminal 139 will represent 4's. The output signal at terminal 149 represents $1\times6=6$'s. At output terminal 159 the signal will represent $2\times6=12$'s, while at output terminal 169 the output signal represents $4\times6=24$'s. The first, second and third circles have internally cyclic patterns which are repeated six times, and the outputs at terminals 119, 129 and 139 represent in the natural binary code the least significant digit of the senary count. The outputs of the fourth, fifth and sixth circles at terminals 149, 159 and 169 represent in the natural binary code the next more significant digit of the senary count. The origin and destination of the inputs and outputs of the latter three circles have been determined so as to provide an externally cyclic converter.

It will be appreciated that since it is the negative terminal of input excitation battery 100 which is grounded, positive voltages will be applied to my converter, and the orientation or polarity of the crystals is such that they will pass signals from the first circle to the sixth circle. I may conveniently provide that auxiliary battery 111a have a voltage substantially half that of input excitation battery 100 and that input resistor 101 and first circle loading resistor 117 have substantially equal resistance values. The resistance values of loading resistors 127, 137, 147, 157 and 167 are conveniently chosen to be equal and to be much larger than that of input resistor 101 or input loading resistor 117, while much smaller than the back resistance of the crystals. When the pattern of movable segments lying under the stationary brushes is such that input brush 112 contacts any segment 113, the output voltage at both brushes 118 and 112 and at output terminal 119 will be half that of input excitation battery 100, thereby representing a "1," whereas the auxiliary output at the negative terminal of auxiliary battery 111a will represent a "0," since it will rest substantially at ground. When input brush 112 is disposed in an intersegment space, first circle loading resistor 117 will ensure that return of the voltage on output terminal 119 to ground, thereby representing a "0," and the lack of significant loading on input resistor 101 will cause the auxiliary output voltage at the negative terminal of auxiliary battery 111a to rise to one-half that of input excitation battery 100, thereby representing a "1." The loading resistors 127, 137, 147, 157 and 167 ensure that the output terminals 129, 139, 149, 159 and 169 return to ground to represent a "0" when not energized despite the small currents which may flow through the back resistance of the crystals when both input brushes contact the same segment. As the pattern is moved under the stationary brushes, conduction will be switched alternately back and forth between brushes 122 and 122a; 132 and 132a; 142 and 142a; 152 and 152a; 162 and 162a; and between brushes 172 and 172a. This alternate stepping action causes conuction in effect to jump across the transfer point of any particular circle and thereby prevents ambiguities from arising in the converter outputs. As the disk pattern is moved under stationary input brush 112 so that it occupies the successive intervals 0, 1, 2, . . . 34, 35 and 0 again, as indicated by the underscored numbers, the binary outputs and corresponding senary count of this particular form of my converter will be given in the following table:

| Decimal Count and Position | Output from Terminals | | | | | | Senary Count |
|---|---|---|---|---|---|---|---|
| | 169 | 159 | 149 | 139 | 129 | 119 | |
| 0 | 0 | 0 | 0 | 0 | 0 | 0 | 00 |
| 1 | 0 | 0 | 0 | 0 | 0 | 1 | 01 |
| 2 | 0 | 0 | 0 | 0 | 1 | 0 | 02 |
| 3 | 0 | 0 | 0 | 0 | 1 | 1 | 03 |
| 4 | 0 | 0 | 0 | 1 | 0 | 0 | 04 |
| 5 | 0 | 0 | 0 | 1 | 0 | 1 | 05 |
| 6 | 0 | 0 | 1 | 0 | 0 | 0 | 10 |
| 7 | 0 | 0 | 1 | 0 | 0 | 1 | 11 |
| 8 | 0 | 0 | 1 | 0 | 1 | 0 | 12 |
| 9 | 0 | 0 | 1 | 0 | 1 | 1 | 13 |
| 10 | 0 | 0 | 1 | 1 | 0 | 0 | 14 |
| 11 | 0 | 0 | 1 | 1 | 0 | 1 | 15 |
| 12 | 0 | 1 | 0 | 0 | 0 | 0 | 20 |
| 13 | 0 | 1 | 0 | 0 | 0 | 1 | 21 |
| 14 | 0 | 1 | 0 | 0 | 1 | 0 | 22 |
| 15 | 0 | 1 | 0 | 0 | 1 | 1 | 23 |
| 16 | 0 | 1 | 0 | 1 | 0 | 0 | 24 |
| 17 | 0 | 1 | 0 | 1 | 0 | 1 | 25 |
| 18 | 0 | 1 | 1 | 0 | 0 | 0 | 30 |
| 19 | 0 | 1 | 1 | 0 | 0 | 1 | 31 |
| 20 | 0 | 1 | 1 | 0 | 1 | 0 | 32 |
| 21 | 0 | 1 | 1 | 0 | 1 | 1 | 33 |
| 22 | 0 | 1 | 1 | 1 | 0 | 0 | 34 |
| 23 | 0 | 1 | 1 | 1 | 0 | 1 | 35 |
| 24 | 1 | 0 | 0 | 0 | 0 | 0 | 40 |
| 25 | 1 | 0 | 0 | 0 | 0 | 1 | 41 |
| 26 | 1 | 0 | 0 | 0 | 1 | 0 | 42 |
| 27 | 1 | 0 | 0 | 0 | 1 | 1 | 43 |
| 28 | 1 | 0 | 0 | 1 | 0 | 0 | 44 |
| 29 | 1 | 0 | 0 | 1 | 0 | 1 | 45 |
| 30 | 1 | 0 | 1 | 0 | 0 | 0 | 50 |
| 31 | 1 | 0 | 1 | 0 | 0 | 1 | 51 |
| 32 | 1 | 0 | 1 | 0 | 1 | 0 | 52 |
| 33 | 1 | 0 | 1 | 0 | 1 | 1 | 53 |
| 34 | 1 | 0 | 1 | 1 | 0 | 0 | 54 |
| 35 | 1 | 0 | 1 | 1 | 0 | 1 | 55 |
| 0 | 0 | 0 | 0 | 0 | 0 | 0 | 00 |

It can be seen that the transfer points of the second circle are coincident with those of the first and that between each two transfer points of the second circle lie an even number of transfer points of the first circle. This has to be true for the first and second circles since the senary system is even-numbered.

Consequently I must supply the two inputs to the second circle from the two outputs of the first circle, thereby cascading the first and second circles. It can be seen that the transfer points of the third circle are not coincident with those of the second circle. Besides this, there is not an even number of transfer points of the second circle between two adjacent transfer points of the third circle. Hence, I must derive the two inputs fed to the third circle from the two outputs of a remote preceding circle, namely, the first circle. The fourth circle supplies the least significant binary digit for the next most significant digit of the senary count and is composed of segments which are six times the length of those of the first circle. Hence, in every case the transfer points of the circle which supplies the least significant binary digit of the next most significant digit of the system, in this case the fourth circle, will always have a correspondence between its transfer points and those of the preceding circle, the third in this case, and there will always be an even number of transfer points of that preceding circle between two adjacent transfer points of such circle, the fourth in this case. Consequently, the two inputs to the fourth circle are derived directly from the two outputs of the third circle. In every case that circle which supplies the second least significant binary digit of the next more significant digit of the particular system, the fifth circle in this case, also meets the rule for cascading and, hence, the two inputs to the fifth circle are derived directly from the two outputs of the fourth circle.

If it is not desired to make my converter externally cyclic and only two digits of a particular number system are to be represented on one movable member, cascading may be employed for all remaining rows or circles mounted on the movable member. However, when, as in this case, I may desire to make my converter externally cyclic, the same cascading rules will apply to the remaining circle or circles. Therefore, since the sixth circle does not meet the cascading rule, I must derive its two inputs from the two outputs of a remote preceding circle, namely the fourth circle. To increase the maximum count further without employing a disk of excessive diameter, I may drive a second disk geared down by a ratio of 6 to 1, and supply two inputs to the first circle of the second disk from the two outputs of the sixth circle of the first disk. To accomplish this, brushes **168*a*, 172*a*, 172 and crystals 165*a* and 165** are required.

Figure 2:
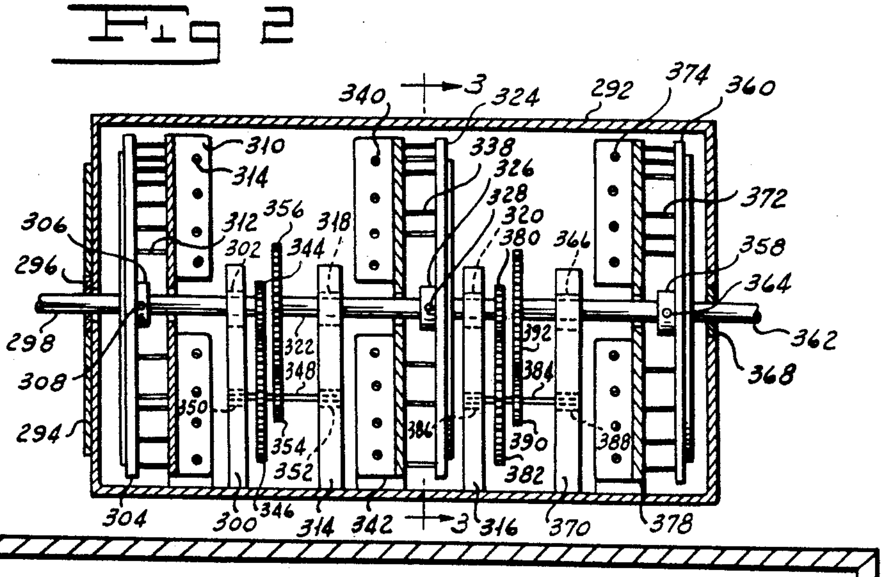
Figure 2 is a side elevation with parts in section of a triple-speed cyclic form of my invention in which an output is produced in the binary coded decimal system.

Referring now to Figure 2, in which I have shown a coded decimal converter having a maximum count of 1,000, three groups of outputs are produced, and each group to represent a binary count of 10 has four outputs. An input shaft 298 is supported by a bearing 296 carried by an end plate 294 secured to one end of a housing 292 and by a bearing 302 in a mounting member 300 secured to housing 292. A first disk 304 with a maximum count of 10 is secured to shaft 298 by a set screw or pin 308 through its hub 306. Brush mounting member 310 carries the stationary brushes 312 which may be accurately adjusted by positioning screws 314. Brushes 312 contact the pattern of disk 304. Fixed to shaft 298 is a pinion 344 meshing with a gear 346 carried by a countershaft 348 mounted in bearings 350 and 352 carried respectively by a first mounting member 300 and by a second mounting member 314. A pinion 354 fixed on countershaft 348 meshes with a gear 356 fixed to a second shaft 322 which is supported by bearings 318 and 320 carried respectively by a second mounting member 314 and a third mounting member 316. The second disk 324 is fixed to shaft 322 by a set screw or pin 328 through its hub 326. The second disk has a maximum count of 10 and the gear reduction afforded by pinion 344, gear 346, pinion 354 and gear 356 between shafts 298 and 322 is 10 to 1. Stationary brushes 338, which contact the pattern on disk 324, are carried by a mounting member 342 and are conveniently adjusted by screws 340. A pinion 380 fixed to shaft 322 meshes with a gear 382 fixed to a second countershaft 384 carried by bearings 386 and 388, carried respectively by third mounting member 316 and a fourth mounting member 370. A pinion 390 fixed to countershaft 384 meshes with a gear 392 fixed to a shaft 362 which is supported by bearings 366 and 368 carried respectively by fourth mounting member 370 and the other side of housing 292. A third disk 360, which has a maximum count of 10, is secured to shaft 362 by a set screw or pin 364 through its hub 358. Stationary brushes 372 which contact the coded pattern on disk 360 are carried by mounting member 378 and may be accurately positioned by set screws 374. The gear reduction afforded by pinion 380, gear 382, pinion 390 and gear 392 between shafts 322 and 362 is also 10 to 1.

Figure 3:
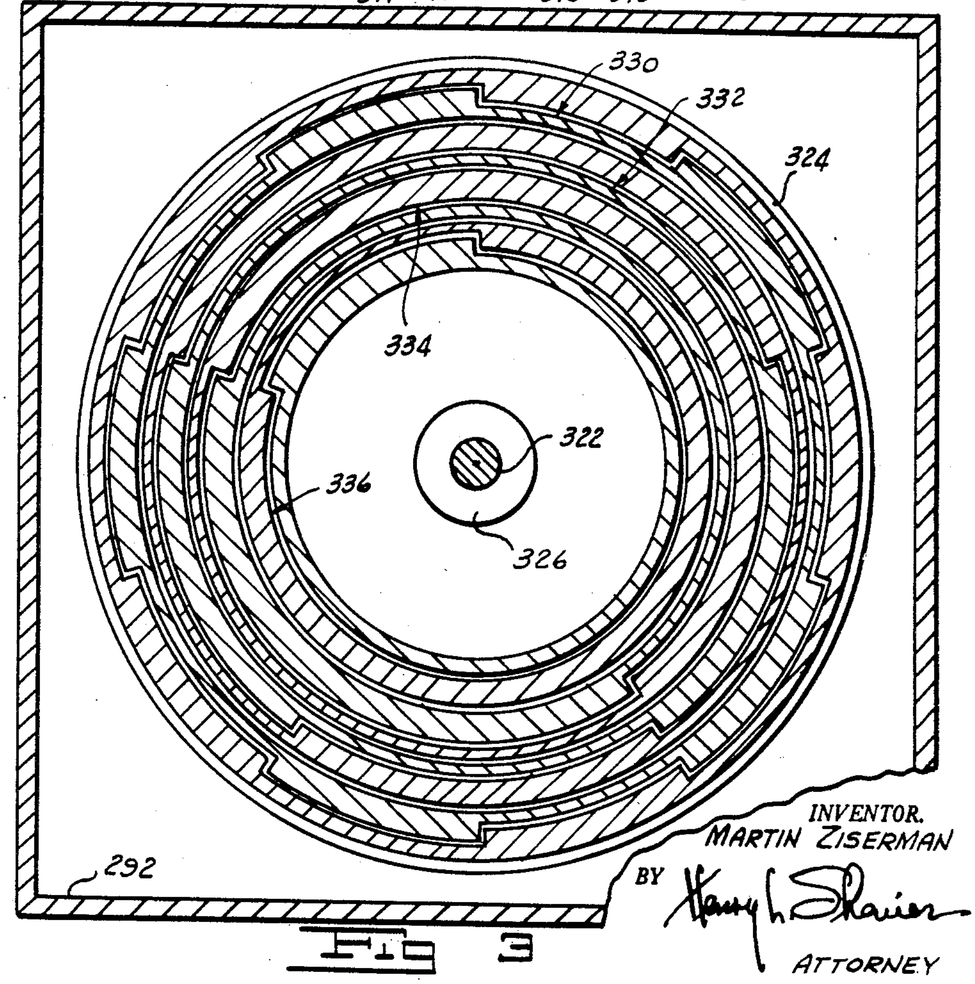
Figure 3 is a sectional view drawn on an enlarged scale and taken along the line 3—3 of Figure 2 showing a binary coded decimal disk pattern.

Referring now to Figure 3, the second disk 324, which has a maximum count of 10, may conveniently be made of some insulating material such as plastic resin and the conducting pattern may conveniently be deposited and then photoetched upon its surface. To provide a maximum count of 10, four circles of segments are required. Conveniently, to provide complementary outputs, each of the four circles of segments is made of two intermeshing rings of teeth to provide direct and complementary slip rings and direct and complementary or auxiliary segments. The first circle is indicated by the general reference character 330, the second by 332, the third by 334 and the fourth by 336.

In operation of the coded decimal form of my converter shown in Figures 2 and 3, the first circle of the second disk is supplied with two complementary inputs from two spaced input brushes, which inputs are derived from the two complementary outputs of the last circle of the first disk. The third disk 360, which may be similar in all respects to the second disk, is provided with two complementary inputs to its first circle from the two complementary outputs of the last circle of the second disk 324. The first disk 304 is a mirror image of disks 324 and 360 except for the omission of the auxiliary intermeshing ring of teeth of circle 330. It will be appreciated that the maximum count of the converter may be increased to 10,000 by increasing the count of the first disk 304 to 100. This is accomplished by providing eight circles of segments, the pattern of the last four being identical to that for disks 324 and 360. The first four circles will have an internally cyclic pattern which is a replica of that shown in Figure 3, but which will be repeated ten times. The first circle will not have an auxiliary intermeshing ring of teeth.

A fragmentary table showing representative binary coded decimal outputs from the converter shown in Figures 2 and 3 follows:

| Decimal Count | Output of Disk 360 | Output of Disk 324 | Output of Disk 304 |
|---|---|---|---|
| 1 | 0 0 0 0 | 0 0 0 0 | 0 0 0 1 |
| 5 | 0 0 0 0 | 0 0 0 0 | 0 1 0 1 |
| 26 | 0 0 0 0 | 0 0 1 0 | 0 1 1 0 |
| 85 | 0 0 0 0 | 1 0 0 0 | 0 1 0 1 |
| 186 | 0 0 0 1 | 1 0 0 0 | 0 1 1 0 |
| 243 | 0 0 1 0 | 0 1 0 0 | 0 0 1 1 |
| 392 | 0 0 1 1 | 1 0 0 1 | 0 0 1 0 |
| 576 | 0 1 0 1 | 0 1 1 1 | 0 1 1 0 |
| 974 | 1 0 0 1 | 0 1 1 1 | 0 1 0 0 |

It will be seen that I have accomplished the objects of my invention. My converter is adapted to produce binary coded outputs in any even-numbered system, such as the senary and decimal systems. My converter is small and light and the only significant torque required will be the contact friction of the brushes. My converter consumes very little power since the brushes act as switches, crystals are highly efficient with a high back resistance and, consequently, the loading resistors may have large resistance values and will therefore consume little power. The only auxiliary circuitry required will be one switching circuit, or even more simply, a voltage dividing arrangement, such as I have shown, including resistors 101 and 117. All other switching operations are inherently performed internally since, as I have indicated, the brushes themselves act as switches. In its simplest form where only one disk is employed, my converter has only one moving part.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An analogue to digital converter for providing a digital representation in any binary coded even-numbered system of the relative displacement between two members including in combination a first member, a second member, means mounting the first and second members for relative movement, a first plurality of consecutive rows of conductive elements mounted on the first member, a source of input excitation voltage, means for obtaining two outputs complementary to one another from each but the last row of the first plurality of rows, means including means mounted on the second member of coupling to each but the first row of the first plurality of rows two inputs complementary to one another and derived directly from the two complementary outputs of the immediately preceding row, means including means mounted on the second member for coupling the input excitation voltage to the first row of the first plurality of rows, a second plurality of consecutive rows of conductive elements mounted on the first member where the first row of the second plurality of rows is the last row of the first plurality of rows, means for obtaining an output from each but the last row of the second plurality of rows, means including means mounted on the second member for coupling two complementary inputs to each but the first row of the second plurality of rows, the two complementary inputs to the last row of the second plurality of rows being derived from the two complementary outputs of the penultimate row of the first plurality of rows, a third plurality of consecutive rows of conductive elements mounted on the first member where the first row of the third plurality of rows is the last row of the second plurality of rows, means for obtaining two complementary outputs from each but the last row of the third plurality of rows, means for obtaining an output from the last row of the third plurality of rows, and means including means mounted on the second member for coupling to each but the first row of the third plurality of rows two complementary inputs derived directly from the two complementary outputs of the immediately preceding row.

2. An analogue to digital converter as in claim 1 in which the first member is formed of insulating and nonconductive material.

3. An analogue to digital converter as in claim 1 in which the first row of the first plurality of rows includes two conductive elements each of predetermined length spaced apart, thereby to define a nonconductive space of predetermined length therebetween.

4. An analogue to digital converter as in claim 1 where the first row of the first plurality of rows includes two conductive elements spaced apart, where the complementary output means for said row includes a conductive strip mounted on the first member and where said two conductive elements are both connected to said conductive strip to form a rack of teeth.

5. An analogue to digital converter as in claim 1 in which the complementary output means for the first row of the first plurality of rows includes auxiliary logic circuitry.

6. An analogue to digital converter as in claim 1 in which the coupling means for the two complementary inputs to the second row of the first plurality of rows includes two unilateral impedances.

7. An analogue to digital converter as in claim 1 in which the coupling means for the two complementary inputs to the second row of the first plurality of rows includes two brushes spaced apart a predetermined distance and mounted on the second member.

8. An analogue to digital converter as in claim 1 in which the coupling means for the input excitation includes a brush mounted on the second member.

9. An analogue to digital converter as in claim 1 where the first row of the third plurality of rows includes two conductive elements separated by an auxiliary conductive element, where the complementary output means for said row includes a conductive strip and an auxiliary conductive strip, and where said two conductive elements are connected to said conductive strip and said auxiliary conductive element is connected to said auxiliary conductive strip to form two intermeshing racks of teeth.

10. A cyclic analogue to digital converter for providing a digital representation in any binary coded even-numbered system of the relative rotation between two members including in combination a first member a second member, means mounting the first and second members for relative rotation, a first plurality of consecutive circles of conductive segments mounted on the first member, a source of input excitation voltage, means for obtaining two outputs complementary to one another from each but the last circle of the first plurality of circles, means including means mounted on the second member for coupling to each but the first circle of the first plurality of circles two inputs complementary to one another and derived directly from the two complementary outputs of the immediately preceding circle, means including means mounted on the second member for coupling the input excitation voltage to the first circle, a second plurality of consecutive circles of conductive segments mounted on the first member where the first circle of the second plurality of circles is the last circle of the first plurality of circles, means for obtaining an output from each but the last circle of the second plurality of circles, means including means mounted on the second member for coupling two complementary inputs to each but the first circle of the second plurality of circles, the two complementary inputs to the last circle of the second plurality of circles being derived from the two complementary outputs of the penultimate circle of the first plurality of circles, a third plurality of consecutive circles of conductive segments mounted on the first member where the first circle of the third plurality of circles is the last circle of the second plurality of circles, means for obtaining two complementary outputs from each but the last circle of the third plurality of circles, means including means mounted on the second member for coupling to each but the first circle of the third plurality of circles two complementary inputs derived directly from the two complementary outputs of the immediately preceding circle, a fourth plurality of consecutive circles of conductive segments mounted on the first member where the first circle of the fourth plurality of circles is the last circle of the third plurality of circles, means for obtaining an output from each circle of the fourth plurality of circles, means including means mounted on the second member for coupling two complementary inputs to each but the first circle of the fourth plurality of circles, the two complementary inputs to the last circle of the fourth plurality of circles being derived from the two complementary outputs of the penultimate circle of the third plurality of consecutive circles.

11. A cyclic analogue to digital converter as in claim 10 in which the first member is an insulating nonconductive disk.

12. A cyclic analogue to digital converter as in claim 10 in which the first circle of the first plurality of circles includes two conductive segments each of predetermined length of arc spaced apart thereby to define a nonconductive space of predetermined length of arc therebetween.

13. A cyclic analogue to digital converter as in claim 10 where the first circle of the first plurality of circles includes two conductive segments spaced apart, where the complementary output means for said circle includes a conductive slip ring mounted on the first member and where said two conductive segments are connected to said slip ring to form a ring of teeth.

14. A cyclic analogue to digital converter as in claim 10 in which the complementary output means for the first circle of the first plurality includes auxiliary logic circuitry.

15. A cyclic analogue to digital converter as in claim 10 in which the coupling means for the two complementary inputs to the second circle of the first plurality includes two unilateral impedances.

16. A cyclic analogue to digital converter as in claim 10 in which the coupling means for the two complementary inputs to the second circle of the first plurality of circles includes two brushes spaced apart a predetermined length of arc and mounted on the second member.

17. A cyclic analogue to digital converter as in claim 10 in which the coupling means for the input excitation voltage includes a brush mounted on the second member.

18. A cyclic analogue to digital converter as in claim 10 where the first circle of the third plurality of circles includes two conductive segments separated by an auxiliary conductive segment, where the complementary output means for said circle includes a conductive slip ring and an auxiliary conductive slip ring, and where said two conductive segments are connected to said slip ring and said auxiliary conductive segment is connected to said auxiliary slip ring to form two intermeshing rings of teeth.

19. An analogue to digital converter for providing a digital representation of relative rotation in any given binary coded even-numbered system including in combination a first member, a second member, a third member, means mounting the first member for relative rotation with respect to the third member, means mounting the second member for relative rotation with respect to the third member, means providing a speed reduction equal to an integral power of the given system number between the first and second members whereby the speed of rotation of the second member is less than that of the first member, a first plurality of consecutive circles of conductive segments mounted on the first member, a source of input excitation voltage, means for obtaining two outputs complementary to one another from each but the last circle of the first plurality of circles, means including means mounted on the third member for coupling to each but the first circle of the first plurality of circles two inputs complementary to one another and derived directly from the two complementary outputs of the immediately preceding circle, means including means mounted on the third member for coupling the input excitation voltage to the first circle of the first plurality of circles, a second plurality of consecutive circles of conductive segments mounted on the first member where the first circle of the second plurality of circles is the last circle of the first plurality of circles, means for obtaining an output from each but the last circle of the second plurality of circles, means including means mounted on the third member for coupling two complementary inputs to each but the first circle of the second plurality of circles the two complementary inputs to the last circle of the second plurality of circles being derived from the two complementary outputs of the penultimate circle of the first plurality of consecutive circles, a third plurality of consecutive circles of conductive segments where the first circle of the third plurality of circles is the last circle of the second plurality of circles and where each but the first circle of the third plurality of circles is mounted on the second member, means for obtaining two complementary outputs from each but the last circle of the third plurality of circles, means for obtaining an output from the last circle of the third plurality of circles and means including means mounted on the third member for coupling to each but the first circle of the third plurality of circles two complementary inputs derived directly from the two complementary outputs of the immediately preceding circle.

20. An analogue to digital converter as in claim 19 in which the first and second members are insulating nonconductive disks, in which the speed reduction is equal to the given system number and is provided by a gear train including four gears forming two pairs of gear meshes, in which the first circle of the first plurality of circles includes two conductive segments each of predetermined length of arc spaced apart thereby to define a nonconductive space of predetermined length of arc therebetween, in which the complementary output means for said first circle of the first plurality of circles includes a conductive slip ring mounted on the first member and auxiliary logic circuitry, in which said two conductive segments are connected to said slip ring to form a ring of teeth, in which the coupling means for the two complementary inputs to the second circle of the first plurality of circles includes two brushes spaced apart a predetermined length of arc mounted on the third member and two unilateral impedances, in which the input excitation voltage coupling means includes a brush mounted on the third member, in which the first circle of the third plurality of circles includes two conductive segments separated by an auxiliary conductive segment, in which the complementary output means for said first circle of the third plurality of circles includes a conductive slip ring and an auxiliary conductive slip ring, and in which said two conductive segments of the first circle of the third plurality of circles are connected to said slip ring of the first circle of the third plurality of circles and said auxiliary segment of the first circle of the third plurality of circles is connected to said auxiliary slip ring of the first circle of the third plurality of circles to form two intermeshing rings of teeth.

References Cited in the file of this patent

UNITED STATES PATENTS

| | | |
|---|---|---|
| 2,192,421 | Wallace | Mar. 5, 1940 |
| 2,666,912 | Gow | Jan. 19, 1954 |
| 2,747,797 | Beaumont | May 29, 1956 |
| 2,750,584 | Goldfischer | June 12, 1956 |
| 2,792,545 | Kamm | May 14, 1957 |